Aug. 30, 1960     L. F. WOUTERS     2,951,158
RADIATION WAVE DETECTION
Filed Sept. 26, 1956     2 Sheets-Sheet 1

INVENTOR.
LOUIS F. WOUTERS
BY
Roland A. Anderson
ATTORNEY.

Aug. 30, 1960 L. F. WOUTERS 2,951,158
RADIATION WAVE DETECTION
Filed Sept. 26, 1956 2 Sheets-Sheet 2

INVENTOR.
LOUIS F. WOUTERS
BY
*Roland G. Anderson*
ATTORNEY.

United States Patent Office 2,951,158
Patented Aug. 30, 1960

2,951,158

RADIATION WAVE DETECTION

Louis F. Wouters, Hayward, Calif., assignor to the United States of America as represented by the United States Atomic Energy Commission Filed Sept. 26, 1956, Ser. No. 612,341

7 Claims. (Cl. 250—71.5)

The present invention relates to radiation wave detection and, more particularly, to space distributed wave detection.

There are provided by the present invention method and means for simultaneously measuring radiation wave intensities at a plurality of space distributed points and producing therefrom a plot of the wave distribution in space. Although the present invention is applicable to all types of radiated waves with proper transducing, it is particularly useful in the field of atomic radiation and thus the following description is referenced thereto. The invention may be employed, for example, to provide radiation intensity patterns evolved during various nuclear reactions and the information so derived may be employed as in the design and material specifications of apparatus producing the reactions.

It is contemplated by the present invention that a radiation function of time shall be transformed into a two dimensional function of space or in other words a relation $I=I(t)$, where I is intensity and $t$ is time, is to be transformed into the simple relation $y=y(x)$ where $y$ and $x$ are coordinate distances. Such a transformation may be considered as including two parts, of which the intensity to $y$ transformation may be represented by the function, $y=K\Delta I$, where K is an arbitrary constant of proportionality and $\Delta I$ the intensity change, and of which the time to $x$ transformation may be represented by the relation $x=v\Delta t$, where $v$ is the constant velocity of the radiation wave and $\Delta t$ is the time variation. By the present invention, the foregoing transformations are achieved substantially directly so as to preserve the sense thereof and simplify the method and means employed.

It is an object of the present invention to provide method and means for plotting a radiation wave intensity vs. time function.

It is another object of the present invention to identify a radiation wave shape.

It is a further object of the present invention to provide method and means for relaying radiation wave intensity variations promptly before the sense thereof is destroyed.

It is a still further object of the present invention to measure the intensity of a radiation wave at successive intervals in space and to produce therefrom a plot of radiation wave intensity vs. time.

Numerous other advantages and possible objects of the present invention will become apparent to those skilled in the art from the following description taken in connection with the attached drawings wherein.

Considering first the improved method of the present invention in general, there are produced at equal increments of space from a radiation source signals which are proportional to the radiation wave intensity thereat. These signals are transmitted to a central station where they are combined in proper time relationship based upon known radiation wave velocity so as to provide a series of signals having respective amplitudes proportional to wave intensity at spaced points and retransmitted for recording to produce a plot of radiation wave intensity in space.

More particularly, the method of the invention provides light signals at spaced points proportional in intensity to the intensity of incident radiation at the same time. These light signals are beamed equal distances to a single receiver which is momentarily sensitized to produce a plurality of electrical signals respectively proportional thereto. These electrical signals are then combined in time relationship proportional to spatial separation of the light signal origins to produce a resultant signal including a series of pulses proportional in amplitude to instantaneous radiation wave intensity at spaced points The resultant signal is then plotted against time as by transmission to a recorder to provide an intensity-distance graph of a radiation wave measured.

Figure 1:
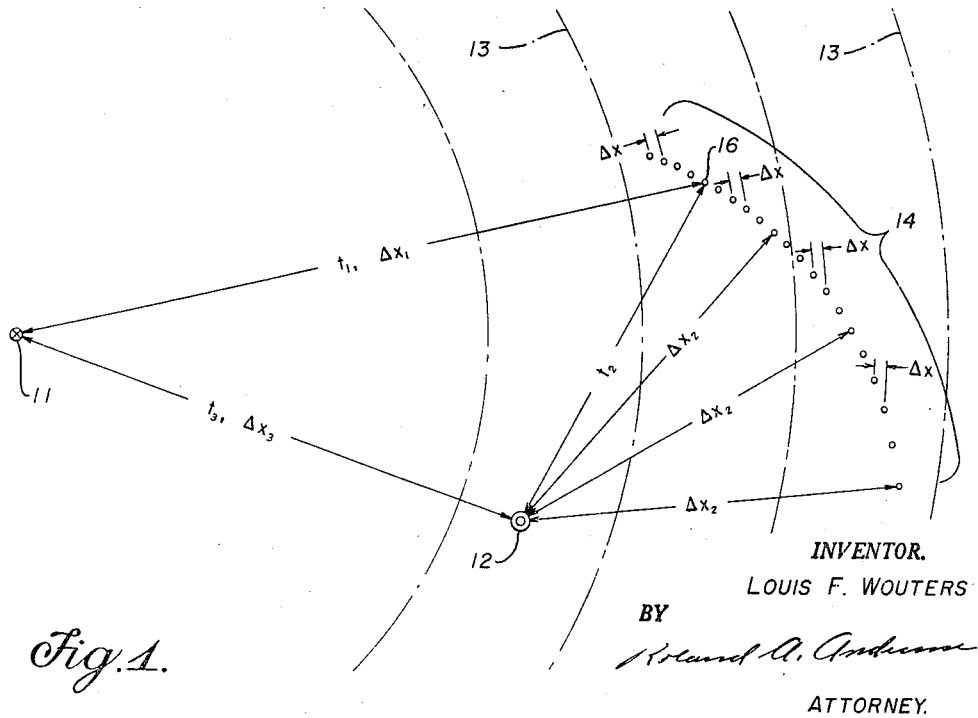
Figure 1 is a diagram of an advantageous spatial arrangement of a preferred embodiment of the invention.

Considering now the invention in some detail and referring to particular apparatus capable of carrying out the foregoing method, there is provided at a distance from a radiation source 11 a central station 12, described in more detail below. Radiation waves generated at the source 11 propagate generally radially outward therefrom such as indicated in part by the dashed lines 13 in Fig. 1. In order to take a picture of the wave there are provided an array of radiation detection stations 14 spaced equal distances apart radially of the source 11 and equidistant from the central station 12.

The stations of the array 14 each receives radiation from the source and detects same to produce light signals having intensities proportional to incident radiation intensities. These stations 14 further operate to beam the light signals so derived back to the central station 12. The central station 12 operates to transform the received light signals from the detector array 14 into electrical signals and in order to produce an individual picture of the radiation wave the transformation at the central station is gated. This is accomplished by providing the central station with its own detector whereby a gating signal is derived therefrom.

The central station may resemble a foxhole, including enclosure 21 set into the earth 22 below the level thereof and covered by shielding slabs 23. A plurality of optical systems 25 at the central station each includes a periscope 24 extending through the shielding above ground and directed toward a single detector of the array 14 thereof. Each of the periscopes includes a mirror 26 inclined at a forty-five degree angle to reflect light downward into the enclosure and each of the optical systems includes in disposition beneath a periscope, a second mirror 27 focusing light from the periscope into a lens system 28 that, in turn, transmits light to a single separate photomultiplier tube 29 of an array thereof. The central station further includes a detector 31 disposed above ground to receive radiation and producing light signals therefrom. This detector 31 may take the form of a scintillation crystal, for example, and a light piper 32 extends therefrom through the shielding into the enclosure adjacent a photomultiplier tube 33 for operating the tube in accordance with light produced from radiation striking the detector 31. The individual detectors of the array 14 need only comprise scintillation crystals firmly mounted in spaced relation to produce light proportional to incident radiation and may if desired be hooded to direct this light generally toward the periscopes of the central station.

Figure 4:
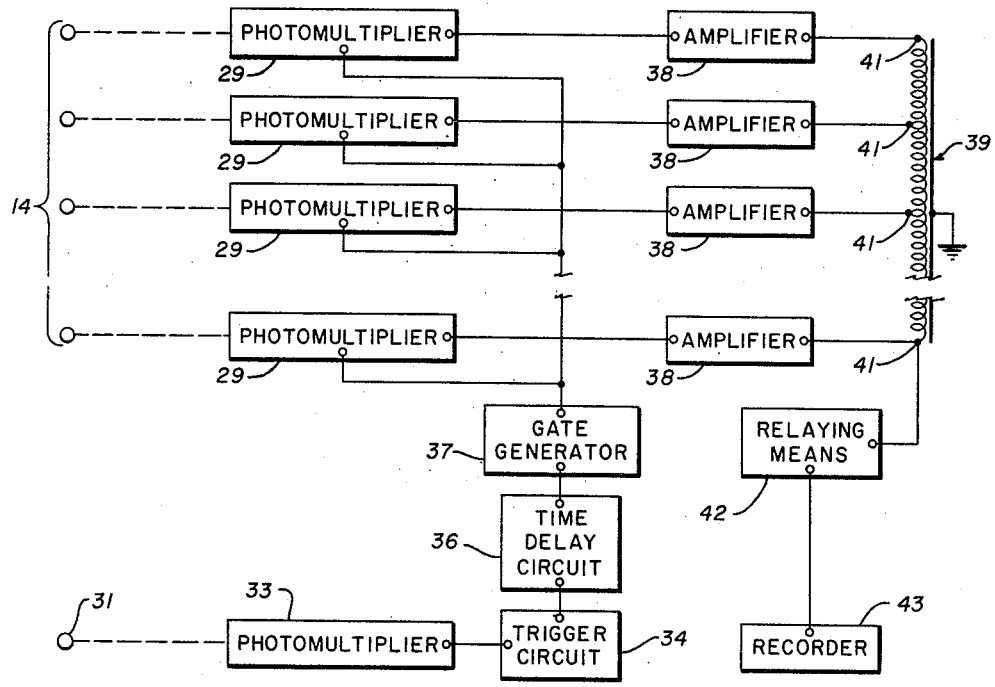
Figure 4 is a schematic illustration of electrical circuitry suitable for use in the invention.
Figure 3:
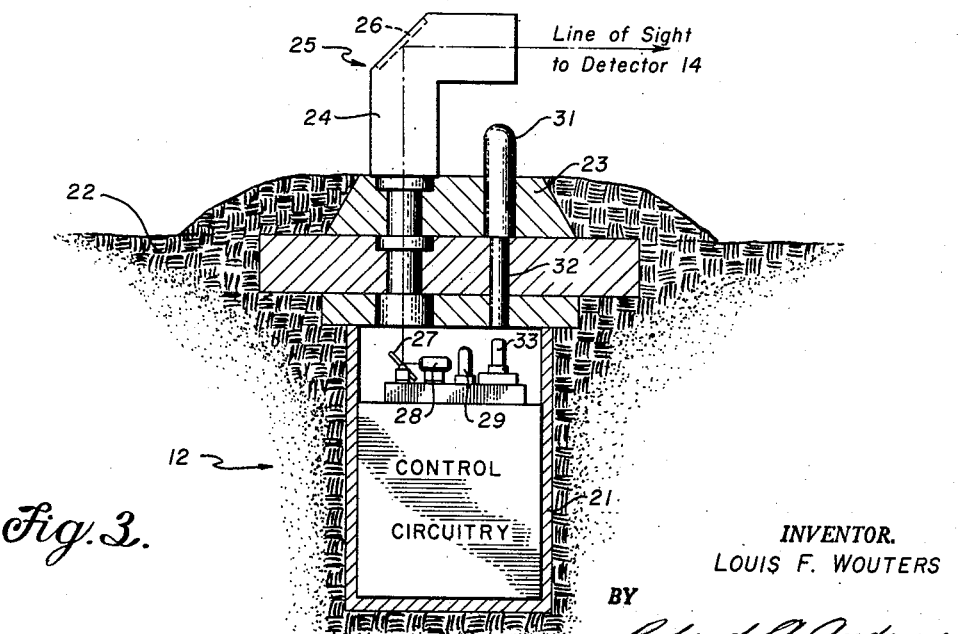
Figure 3 is a sectional view of a detector foxhole as may be employed in the present invention.

As regards a typical circuit of the present invention, reference is made to Fig. 4 wherein there are indicated only a few of the detectors of the array 14 and associated electrical channels of the central station. The central station detector 31 feeds the photomultipler 33 through the light path provided by the piper 32 and this photomultiplier 33 thus produces an electrical signal proportional to the intensity of radiation striking the detector 31. The output of the photomultiplier tube 33 is applied to the input of a biased trigger circuit 34 so that when the photomultiplier tube output exceeds the trigger circuit bias the trigger circuit is actuated to produce a trigger voltage. The voltage output from the trigger circuit 34 is applied through a time delay circuit 36, such as a delay line, to the input of a gate generator 37 for actuating same to produce an output voltage of constant amplitude and predetermined duration. Either the trigger circuit or gate generator may be designed for one-shot operation followed by manual or automatic reset if desired.

There is thus produced by the gate generator 37 a gating signal which is applied to sensitize each of the channels at the photomultipliers 29 thereof, as by application to early dynodes thereof, so that these photomultipliers are controllably sensitized for a predetermined gating period to produce output signals proportional to light input signals from their respective detector of the array 14. Each of the photomultipliers simultaneously produces an output voltage pulse having a duration determined by the gating signal and an amplitude proportional to radiation intensity at one detector of the array 14. To the output of each of the photomultipliers 29 there is connected an amplifier 38 which operates to amplify the voltage magnitude of photomultiplier tube pulses. Although these amplifiers may amplify linearly, the dynamic range of intensities of the radiation wave measured by the photomultipliers 29 may well be so large as to require compression. In this respect a certain known dynamic compression may be introduced by graded optical filters in the aforementioned optical systems 25; however, additional compression may be made by calculated non-linearity of the amplifiers 38. As an example, each amplifier may include a differencing stage having a first input biased by a voltage derived from a theoretical radiation intensity curve and a second input connected to the photomultiplier 29 whereby the difference between inputs is amplified so that the result is a variation from a theoretical value.

All of the photomultipliers are simultaneously energized and produce signals proportional to radiation intensity at the respective detectors of the array. In order to space these photomultiplier signals for recording same, the signals are time separated by means of a delay line 39. The amplifiers 38 are connected to separate taps 41 on the delay line with the tap separation representing time increments proportional to the time required for radiation to travel between the individual detectors of the array 14. The delay line 39 is connected at the sending end thereof to relaying means 42 of any suitable form which in turn feeds a recorder 43 that may be disposed at some distance from the central station 12 and from the array 14. The detector closest the radiation source has the signal therefrom applied to the sending end of the delay line with more remotely positioned detectors of the array feeding delay line points successively further displaced along the line.

As regards the propagation of atomic radiation, such as for example gamma rays, the velocity thereof is substantially equal to the velocity of light, c. In order to obtain an overall picture of a radiation wave an intermediate detector 16 of the array 14 is chosen as the location of the wave peak at the instant of picturing the wave. With this detector 16 spaced a distance $\Delta x_1$ from the source 11, the wave peak will reach the detector 16 at a time $t_1$ from leaving the source wherein $$t_1 = \frac{\Delta x_1}{c}$$

Each of the detectors of the array 14 is spaced from the central station an equal distance $\Delta x_2$ and from each other radially outward from the central station a like distance $\Delta x$ and thus light signals from any detector takes a time $t_2$ to reach the central station wherein $$t_2 = \frac{\Delta x_2}{c}$$

Further the central station 12 is spaced from the radiation source 11 a distance $\Delta x_3$ so that a wave peak would take a time $t_3$ to reach the central station where $$t_3 = \frac{\Delta x_3}{c}$$

Figure 2:
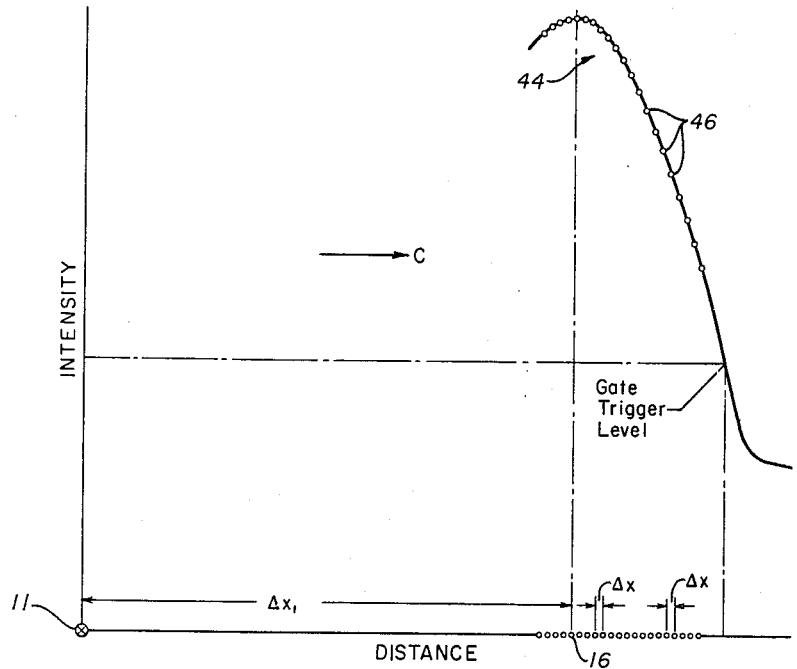
Figure 2 is a plot of radiation wave intensity vs. distance as produced by the present invention.

As previously noted, the circuit is gated by a trigger signal and a particular signal bias will correspond to a certain radiation intensity, such as shown in Fig. 2, so that the trigger operates a time $t_4$ ahead of peak wave intensity at the foxhole and this time $t_4$ may be approximated for purpose of the following. The actual time of the trigger output following radiation propagation from the source is thus $t_3 - t_4$ and it is desired to make this time substantially equal to the time of receipt at the central station of the peak intensity signal from the chosen detector 16 and this time will be seen to be $t_1 + t_2$ from Fig. 2. The foregoing is accomplished by delaying the trigger signal to the gating circuit by the time delay circuit, and this delay time is made equal to $(t_1 + t_2) - (t_3 - t_4)$ so that the photomultipliers are sensitized at the time that the light signal from the wave peak at the chosen detector 16 reaches its photomultiplier.

The photomultiplier tubes are gated to operate for a short period, such as for example $2 \times 10^{-8}$ seconds so that at the instant the wave peak passes the chosen detector 16 all the other detector signals are operated upon to provide delay line pulses proportional to radiation intensity at respective detectors. With equal spacing between detectors radially outward from the source the delay line taps are equally spaced and there is received at the relay means 42 a series of voltage pulses having respective amplitudes proportional to radiation intensity at their associated detectors. This information received at the recorder 43 may be directly graphically recorded to produce a curve 44 somewhat as shown in Fig. 2 including intensity points 46 corresponding to detector signals and separated equal distances $\Delta x$, or may be stored for later transformation into a plot of radiation intensity vs. distance.

It will be appreciated that the above-described apparatus may be employed in other manners than that described. Thus, the time calculations assume a known starting time of radiation propagation in order to locate the wave peak at a particular detector when the wave picture is taken; however, in certain instances this information may not be available so that random wave pictures will be taken and further, repeated wave detection may be made as by automatic reactivation of the apparatus where continuing wave propagation occurs.

What is claimed is:

1. A radiation wave detector comprising a central station, a plurality of detectors equally spaced from said central station and spaced apart radially of a source of radiation, said detectors each producing signals proportional to incident radiation, gated receiving means within said central station for accepting said detector signals and producing voltage pulses therefrom of proportionate amplitude, and time delay means fed by said voltage pulses at spaced points therealong with said points being spaced proportional to detector spacing for producing time spaced signals proportional to radiation intensity at said detectors.

2. A radiation wave detector comprising a plurality of detectors spaced from each other radially of a radiation source and producing light signals proportionate to incident radiation, a central station spaced equidistant from each of said detectors and having a multitude of channels separately associated one with each of said detectors, transducing means in each of said channels for producing electrical signals from incoming light signals, gating means simultaneously sensitizing said transducing means for a very short period whereby each channel produces an output signal proportional to radiation intensity at the associated detector, and means joining said signals in time separation proportional to radiation traverse of detector separation.

3. A radiation wave detector as claimed in claim 2 further defined by said central station including a detector and transducer producing a signal proportional to radiation incident thereon, and delay means applying said signal to actuate said gating means whereby said channel output signals are produced at a predetermined radiation wave position.

4. A radiation wave detector comprising a central station spaced from a source of radiation and having a radation detector producing signals proportional to incident radiation; and a plurality of scintillation detectors disposed equidistant from said central station and equally separated radially of said radiation source for producing light of an intensity proportional to incident radiation intensity; said central station including a plurality of channels with each having an optical system receiving light from a single detector and a photomultiplier producing electrical signals therefrom, a gating circuit for simultaneously sensitizing said photomultipliers and controlled from said central station detector, and means combining the output of said channels in time spaced relationship whereby the resultant signal is proportional to radiation wave intensity over the space of said detectors.

5. A radiation wave detector comprising an array of radiation detectors with equal spacing between said detectors radially of a radiation source; a central station equally spaced from each of the detectors of said array and having a plurality of channels with each receiving signals from a separate detector of said array, delay means, a radiation detector at said central station sensitizing said channels simultaneously through said delay means for producing from said channels signals proportional to radiation intensity at separate detectors of said array, a delay line connected at spaced points to said channels, and a transmitter connected to said delay line; and a recorder receiving the output of said transmitter and transcribing same as a measure of radiation wave intensity variation in space.

6. A radiation wave detector as claimed in claim 5 further defined by said central station including a trigger circuit actuated by the central station radiation detector, delay means connected to said trigger circuit, and a gating circuit controlling operation of said channels and in turn controlled from said delay means whereby said channels are simultaneously sensitized at a desired radiation wave peak location.

7. A radiation wave detector comprising a plurality of scintillation detectors spaced equally apart radially of a radiation source, a plurality of equal length optical systems transmitting light from separate detectors, a plurality of photomultiplier tubes disposed with one in alignment with each optical system, a delay line connected at equally spaced points to the outputs of said photomultipliers, a single radiation detector disposed intermediate said radiation source and said plurality of detectors for producing a signal proportional to incident radiation, a biased trigger circuit controlled by said single radiation detector for producing a trigger pulse upon receipt of an input signal in excess of a predetermined level, a gating circuit controlling operation of said photomultipliers, variable delay means connecting said trigger circuit to said gating circuit for actuating the latter from the former whereby said photomultipliers are gated to operate at a predetermined time after a set radiation level at said single detector and simultaneous signals are applied to said delay line individually proportional to radiation intensity at separate detectors.

References Cited in the file of this patent

UNITED STATES PATENTS

| | | |
|---|---|---|
| 1,971,688 | Lange | Aug. 28, 1934 |
| 2,489,304 | Marchand et al. | Nov. 29, 1949 |